(12) United States Patent
Bonin

(10) Patent No.: US 7,336,443 B2
(45) Date of Patent: Feb. 26, 2008

(54) SLIDER FOR A DATA STORAGE DEVICE WITH A FLOATING TRANSDUCER BODY AND METHOD OF FABRICATION THEREFOR

(75) Inventor: Wayne A. Bonin, North Oak, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 297 days.

(21) Appl. No.: 10/286,321

(22) Filed: Nov. 1, 2002

(65) Prior Publication Data

US 2003/0161070 A1    Aug. 28, 2003

Related U.S. Application Data

(60) Provisional application No. 60/360,650, filed on Feb. 27, 2002, provisional application No. 60/360,599, filed on Feb. 27, 2002.

(51) Int. Cl.
G11B 5/60 (2006.01)
G11B 15/64 (2006.01)
G11B 21/20 (2006.01)

(52) U.S. Cl. .................. 360/234.7; 360/234.3
(58) Field of Classification Search .......... 360/234.7, 360/234.8, 234.9, 236.4, 236.5
See application file for complete search history.

(56) References Cited

U.S. PATENT DOCUMENTS 4,605,977 A * 8/1986 Matthews ............... 360/234.7
5,055,731 A * 10/1991 Nihei et al. ................ 310/309
5,223,998 A * 6/1993 Tokuyama et al. ........ 360/234.7
5,751,517 A * 5/1998 Agarwal ................... 360/235.4
5,856,896 A * 1/1999 Berg et al. ................ 360/245.3
5,943,189 A * 8/1999 Boutaghou et al. ....... 360/234.7
5,991,113 A * 11/1999 Meyer et al. ................. 360/75
6,069,769 A * 5/2000 Dorius et al. ............. 360/235.6
6,181,531 B1 1/2001 Koshikawa et al. ...... 360/294.4
6,344,949 B1 * 2/2002 Albrecht et al. .......... 360/236.5
6,580,687 B1 * 6/2003 Cumpson et al. ........... 369/300
6,690,543 B2 * 2/2004 Kurita et al. ............ 360/234.7
2002/0075600 A1 6/2002 Schnur et al.

FOREIGN PATENT DOCUMENTS

EP       0 242 597 A2 * 10/1987

OTHER PUBLICATIONS

"A Microactuator for Head Positioning System of Hard Disk Drives" by H. Fujita et al., for *IEEE Transactions on Magnetics*, vol. 35, No. 2, Mar. 1999.

* cited by examiner

*Primary Examiner*—Angel Castro
*Assistant Examiner*—Christopher R. Magee
(74) *Attorney, Agent, or Firm*—Westman, Champlin & Kelly, P.A.

(57) ABSTRACT

A head for a data storage device including an independently supported transducer body floatably coupled to the slider body and including at least one transducer element. The transducer body is independently supported relative to the disc surface to provide transducer level control for read-write operations.

22 Claims, 19 Drawing Sheets

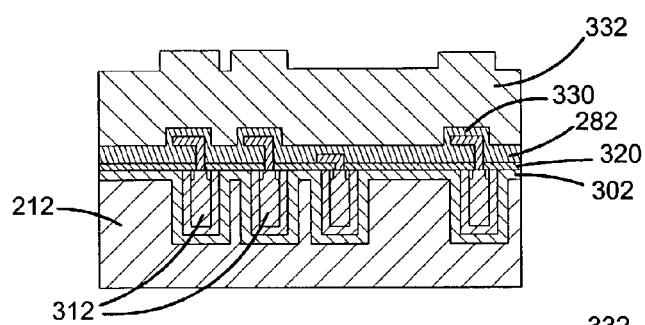
FIG. 52
FIG. 53
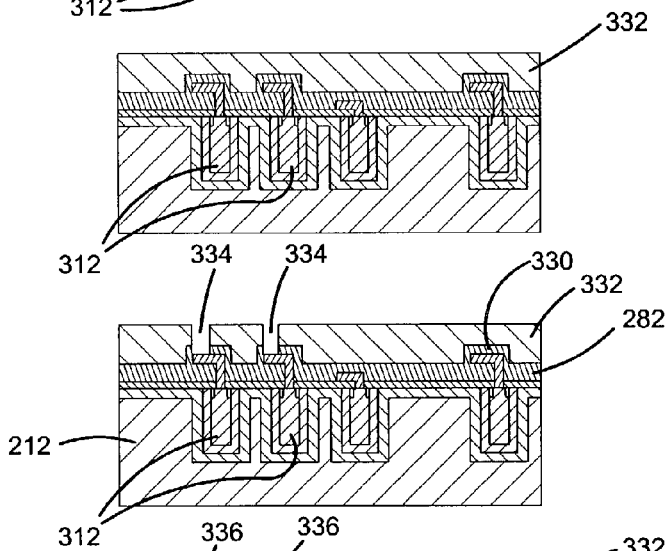
FIG. 54
FIG. 55
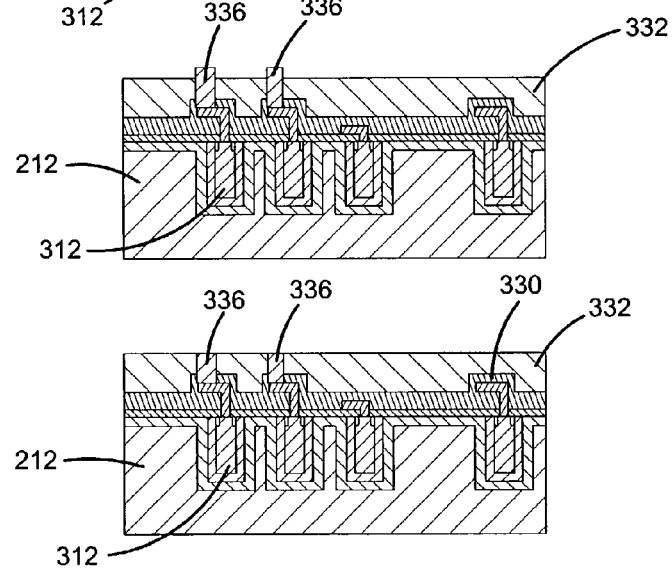
FIG. 56
FIG. 57
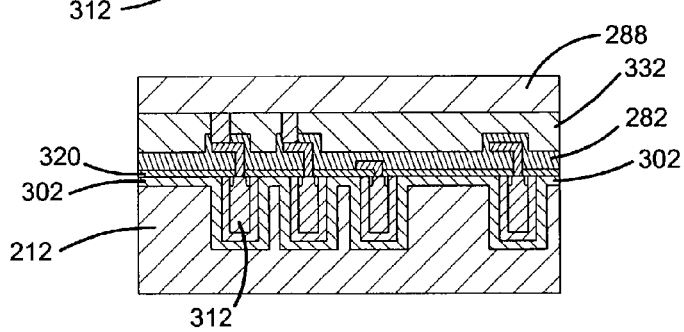

SLIDER FOR A DATA STORAGE DEVICE WITH A FLOATING TRANSDUCER BODY AND METHOD OF FABRICATION THEREFOR

CROSS-REFERENCE TO RELATED APPLICATION

This application claims priority to U.S. Provisional Application Serial No. 60/360,650 filed on Feb. 27, 2002 entitled "SLIDER WITH INDEPENDENTLY SUSPENDED TRANSDUCER" and Ser. No. 60/360,599, filed Feb. 27, 2002 and entitled "METHOD FOR A TRANSDUCER-LEVEL ELECTROSTATIC MICROACTUATOR".

FIELD OF THE INVENTION

The present invention relates generally to data storage devices and more particularly but not by limitation to a head for a data storage device.

BACKGROUND OF THE INVENTION

Data storage devices store digital information on a rotating disc. Heads are coupled to an actuator assembly which is energized to position the head relative to the disc surface for read/write operations. The head includes transducer elements which are supported on an air bearing slider to read data from or write data to the disc. For operation, rotation of the disc creates an air flow along the air bearing of the slider to create a hydrodynamic lifting force. The hydrodynamic lifting force is countered by a load force at a load point so that the slider pitches and rolls above the disc surface at a fly height defined in part by the hydrodynamic lifting force of the air bearing and the load force supplied by a suspension assembly.

Areal density is increasing, necessitating a decrease in fly height parameters or head-disc spacing to increase bits per inch. As the head-disc spacing is decreased, shorter wavelength low amplitude disc roughness becomes more of a problem. As the wavelength of the surface roughness of the disc which the slider is required to follow decreases below the length of the slider it is more difficult for the slider to follow the topography of the disc surface increasing the propensity for head disc contact. Embodiments of the present invention provide solutions to these and other problems, and offer other advantages over the prior art.

SUMMARY OF THE INVENTION

The present invention relates to a head for a data storage device including an independently supported transducer body flexibly coupled to the slider body and including at least one transducer element. The transducer body is independently supported to provide transducer level fly height control for read-write operations. Other features and benefits that characterize embodiments of the present invention will be apparent upon reading the following detailed description and review of the associated drawings.

BRIEF DESCRIPTION OF THE DRAWINGS

FIGS. 33-58 progressively illustrate a fabrication embodiment for an electrical interface between the electrodes on the slider body and the electrodes and transducer elements on the transducer body.

DETAILED DESCRIPTION OF ILLUSTRATIVE EMBODIMENTS

Figure 1:
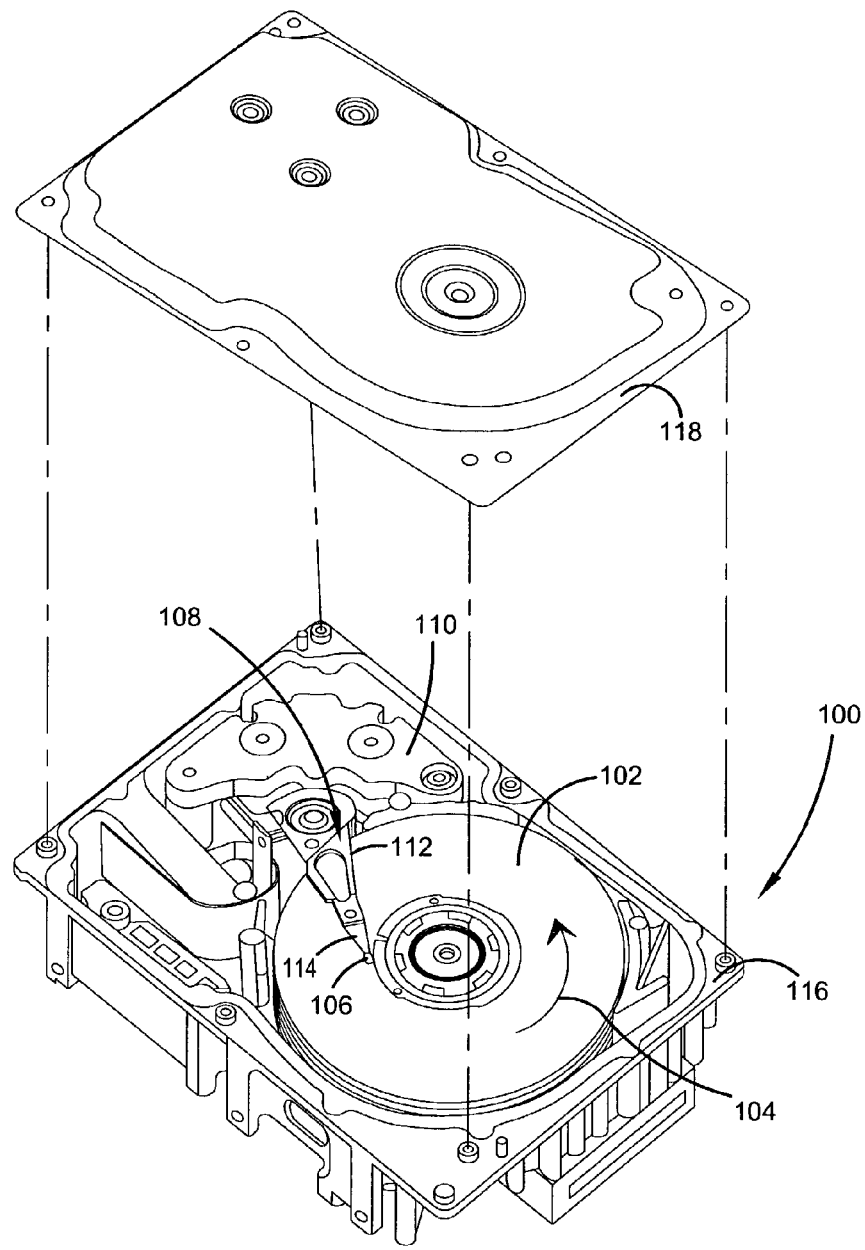
FIG. 1 is a perspective illustration of an embodiment of a data storage device.

FIG. 1 is a perspective illustration of a data storage device 100 in which embodiments of the present invention are useful. Device 100 includes a plurality of discs 102 supported for co-rotation as illustrated by arrow 104 by a spindle motor (not shown). Heads 106 are coupled to an actuator assembly 108 which is operated by a voice coil motor 110 to position the heads 106 for read-write operations. Heads 106 are coupled to arms 112 of the actuator assembly 108 via a suspension assembly 114 to allow the slider to pitch and roll relative to the disc surface. Components of the device 100 are coupled to a base chassis 116 and a cover 118 is secured to the base chassis 116 as schematically illustrated.

Figure 2:
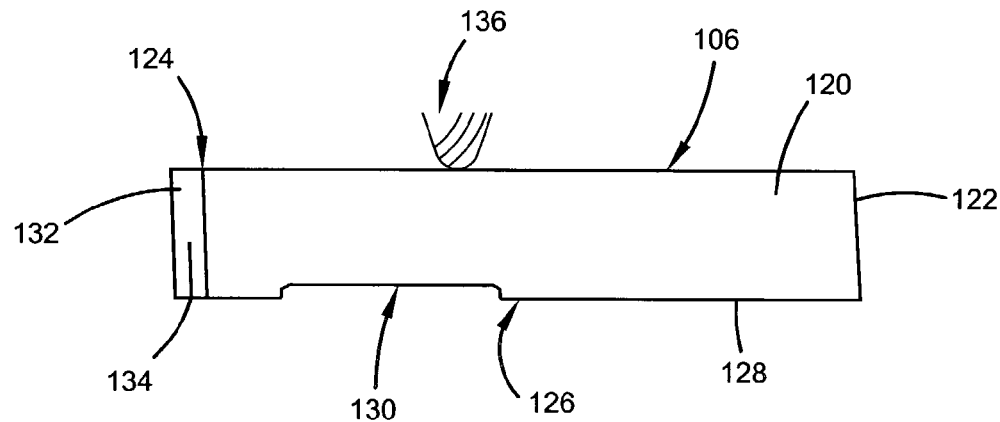
FIG. 2 is a schematic elevation illustration of a slider having a transducer element for read-write operation.

FIG. 2 is an elevational view of head 106 which is coupled to the suspension assembly 114. As shown, the head includes a slider 120 having a leading edge 122 and a trailing edge 124 and an air bearing surface 126. As shown, the air bearing surface 126 includes a raised bearing surface 128 and a recessed bearing surface 130. Raised bearing surface 128 can include opposed bearing rails, opposed side rails and a center pad or alternate air bearing designs. A transducer 132 including a transducer element 134 (illustrated schematically) is formed or deposited on the trailing edge 124 of the slider 120 for read-write operations. Transducer elements 134 can include inductive, magnetoresistive, tunneling magnetoresistive, or magneto-optical transducer elements. For operation, rotation of the disc 102 creates an air flow along the air bearing surface 126 which provides a hydrodynamic lifting force against a load force at a load point 136 to define in part a fly height for the slider 120.

Disc drive areal density is increasing, reducing head-disc spacing for desired read-write resolution and bits per inch density. Head disc spacing is controlled in part by air bearing pressurization where, as head-disc spacing decreases, air bearing pressure increases and air bearing pressure decreases for a larger head-disc spacing to provide a relatively stable fly height. Efforts to reduce fly height or head-disc spacing are limited by the roughness of the disc surface. As the fly height decreases, the shortened wavelength small amplitude disc roughness becomes problematic as it is difficult for the slider to follow the disc topography with wavelengths significantly shorter than the length of the slider increasing the propensity for head disc contact. The present invention relates to a transducer body for transducer level fly height control which is not limited by the geometry or length of the slider nor frequency response limits based upon the mass of the slider and suspension.

Figure 3:
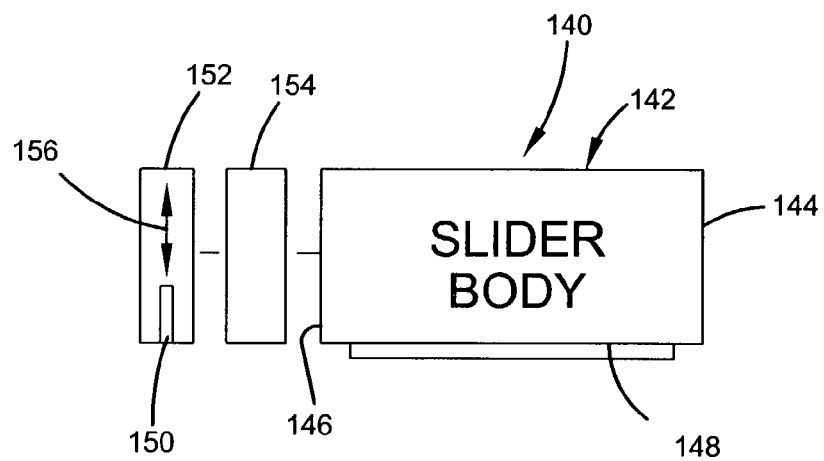
FIG. 3 is a schematic illustration of a head including a slider body and a transducer body having at least one transducer element.

FIG. 3 schematically illustrates an embodiment of a head 140 including an independently suspended or floating transducer body for transducer level fly height control. As shown, head 140 includes a slider body 142 having a leading edge 144, a trailing edge 146, an air bearing surface 148 and transducer element 150 carried on a transducer body 152. The transducer body 152 is flexibly coupled relative to the trailing edge 146 of the slider body 142 through a flexure interface or body 154 as schematically illustrated. The flexible interface flexibly supports the transducer body 152 to allow the transducer body 152 to move as illustrated by arrow 156 to follow the disc roughness to reduce head-disc contact. In the embodiment illustrated, the transducer body 152 provides a smaller mass or body dimension to follow the contour of the disc surface to limit head disc contact.

Figure 4:
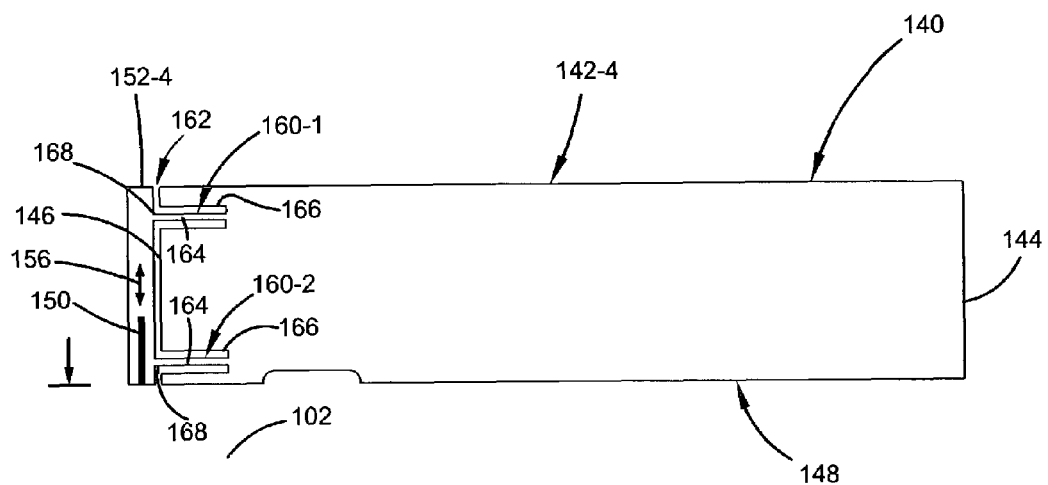
FIG. 4 is an elevational illustration of an embodiment of a head including a slider body and a floating transducer body.
Figure 5:
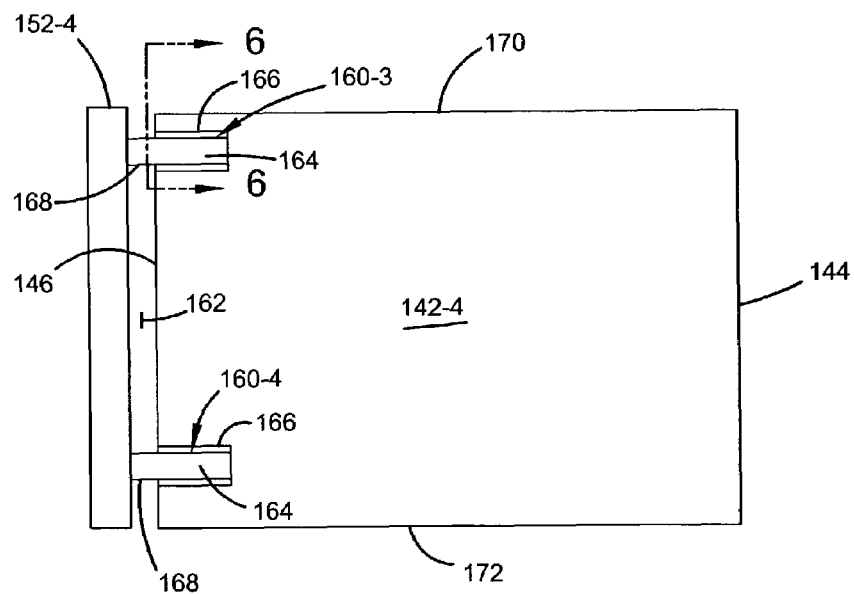
FIG. 5 is a plan illustration of an embodiment of a head including a slider body and a floating transducer body.

FIGS. 4-5 cooperatively illustrate one embodiment of the transducer body 152-4 flexibly coupled to the slider body 142-4 through a flexible interface including a plurality of flexure bodies 160. The transducer body 152-4 is spaced from the slider body 142-4 by a gap 162 and the flexure bodies 160 extend in the gap 162 between the slider body 142-4 and the transducer body 152-4. The flexure bodies 160 have a profile dimension to provide a flexure modulus along a length thereof to allow movement of the transducer body 152-4 relative to the slider body 142 in the direction illustrated by arrow 156, to follow the contour of the disc surface 102 as previously discussed.

In the embodiment shown in FIG. 5, flexure bodies 160 include a first portion 164 extending in trench 166 formed in the slider body and a second portion 168 extends therefrom in the gap 162 between the slider body 142-4 and the transducer body 152-4. In the illustrated embodiment, the flexible interface includes a plurality of elevationally spaced bodies 160-1, 160-2 and a plurality of laterally spaced bodies 160-3, 160-4 between opposed sides 170, 172 of the slider body 142-4. The flexible interface provides an independently suspended transducer body having a smaller mass or body dimension to follow the contour of the disc surface for read-write operations.

Figure 6:
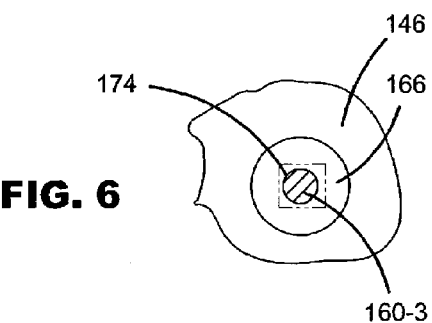
FIG. 6 is a cross-sectional view of a flexure body for the floating transducer body as taken along line 6-6 of FIG. 5.

As illustrated in FIG. 6, the flexible bodies 160 can be formed of a cylindrical shaped rod 174 or alternatively, a square or rectangular shape, as illustrated by the dotted lines.

The profile or shape of the flexure bodies 160 are designed to optimize stiffness, resonance modes and off-axis movement. Although a particular shaped body is illustrated, application of the present invention is not limited to the particular shape or profile shown.

FIGS. 7-10 illustrate embodiments of transducer bodies including raised bearing surfaces 180 and recessed bearing surface 182 to provide transducer level fly height control to limit head disc contact. As described, the transducer body has a relatively low mass and body length to provide an air bearing transducer body having sufficient response at short wavelength disc roughness to follow the contour of the disc surface. In one embodiment, the stiffness or dynamics of the flexure bodies are optimized to provide a spring mass system dominated by the air bearing surface of the transducer body in relation to the spring-mass of the flexible bodies to provide a dynamic response controlled by the air bearing surfaces of the transducer body.

For example, in an illustrated embodiment, the spring constant k of the air bearing of the transducer body is about 120,000 N/m (Newton/meters) to provide a fly height of approximately 6.35 nm for a load force of 750 µN force. The spring constant of the flexure body is less than about 12,000 N/m so that the air bearing will dominate fly height and dynamic operation of the transducer body. In the above example, it is also desirable to provide a spring constant near the upper limit of 12,000 N/m to keep transducer body deflection small. At this stiffness, the resonant frequency of the transducer body is quite high, about 78 kHz so that off track motion will be negligible even with round or square flexure bodies where the off track stiffness is the same as the vertical stiffness.

Figure 7:
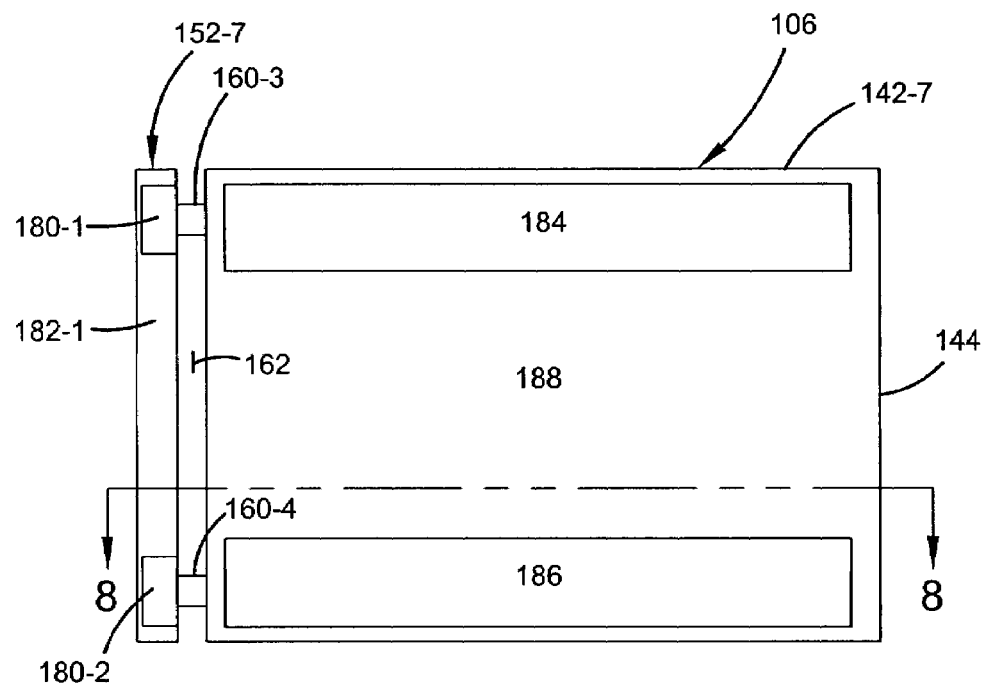
FIG. 7 is an elevational illustration of an embodiment of a head including a slider body and a floating transducer body.
Figure 8:
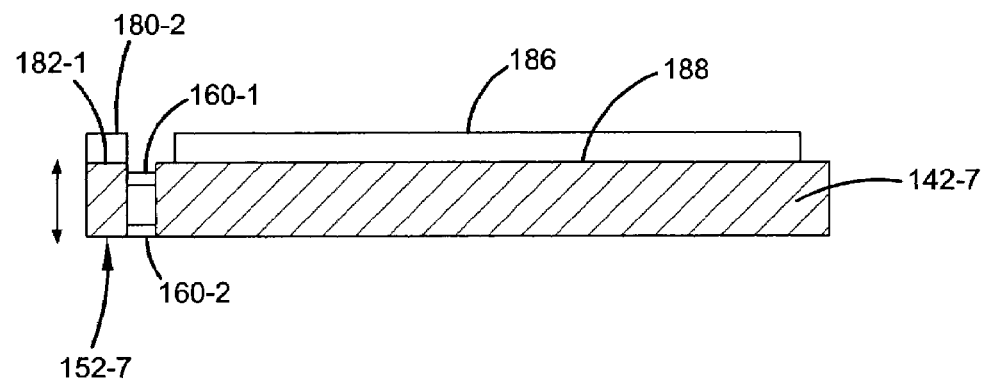
FIG. 8 is a cross-sectional view taken along line 8-8 of FIG. 7.
Figure 9:
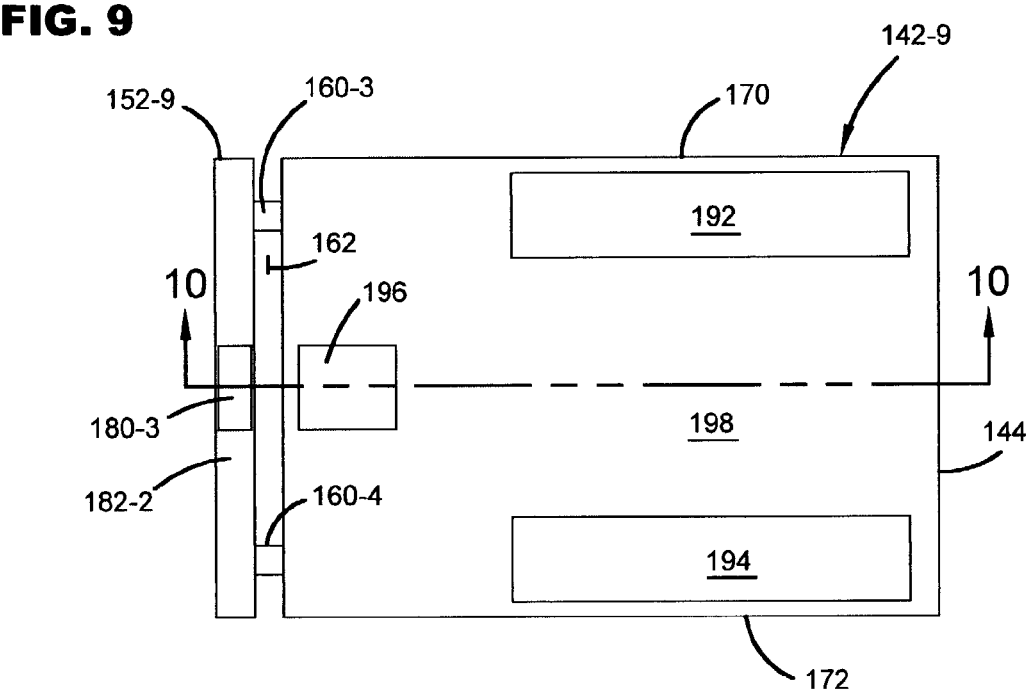
FIG. 9 is an elevational illustration of an embodiment of a head including a slider body and a floating transducer body.
Figure 10:
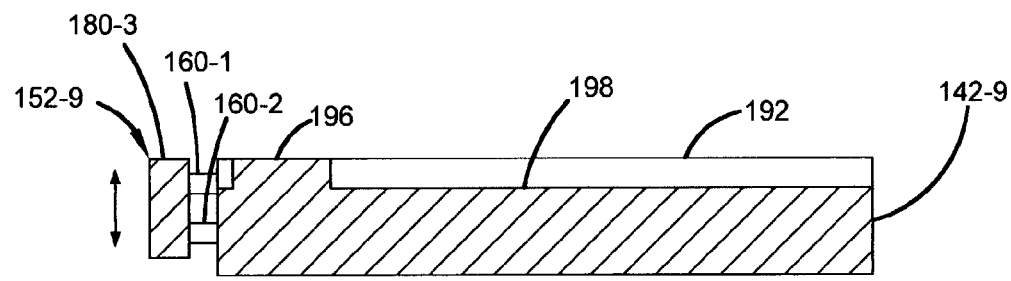
FIG. 10 is a cross-sectional view taken along line 10-10 of FIG. 9.

In the embodiment illustrated FIGS. 7-8, the raised bearing surface of the slider body 142-7 includes opposed raised bearing rails 184, 186 elevated above recessed surface 188 and the raised bearing surface 180 on the transducer body 152-7 includes opposed rail portions 180-1, 180-2 elevated above recessed surface 182-1 as shown. The opposed rail portions 180-1, 180-2 provide roll stability. In the embodiment illustrated in FIGS. 9-10, the raised bearing surface on the slider body 142-9 includes opposed raised rails 192, 194 and a raised center pad 196 which are elevated above recessed surface 198 and the transducer body 152-9 includes a raised center portion 180-3 elevated above recessed bearing surface 182-2.

In embodiments of the present invention, a preload force is supplied to the slider body 142 through a suspension assembly, as previously described, to define, in part, fly height or head-disc spacing. The air bearing on the transducer body is designed to support a preload that is scaled from the preload force on the slider body. In an illustrated embodiment, the flexure bodies are designed to supply preload force to the transducer body. In one embodiment the air bearing surface of the slider body can be recessed from the air bearing surface of the transducer body to provide a set preload force to the transducer body for a desired spring stiffness of the flexure bodies.

For the previous example, with a desired preload force of 750 µN and a spring constant of 12,000 N/m, 750 µN/12,000 N/m gives a required deflection generated by the slider body recess of 62.5 nm. It may be desirable to use a lower spring constant and a larger slider body recess to minimize preload variations on the transducer body due to fly height changes of the slider body. For example, assuming a 2 µinch slider fly height (50.8 nm) with a plus/minus 1 µinch (25.4 nm) variation in fly height due to various disturbances, the preload force applied to the transducer body would vary by plus/minus 25.4 nm times 12,000 N/m equals plus/minus 304.8 μN, which is almost 50%. Thus, by reducing the spring constant by a factor of 10 and increasing the recessed depth of the slider body by the same factor, to 625 nm, transducer body preload variation is reduced plus/minus 5%.

Alternatively the position of the load beam or load point on the slider body can be shifted towards the transducer body 152 to deflect the flexure bodies 160 to provide desired preload force to the transducer body. Shifting the preload point towards the transducer body shifts the pivot or gimbal point of the slider increasing the dependency of preload force of the transducer body upon the pitch of the slider body.

Figure 11:
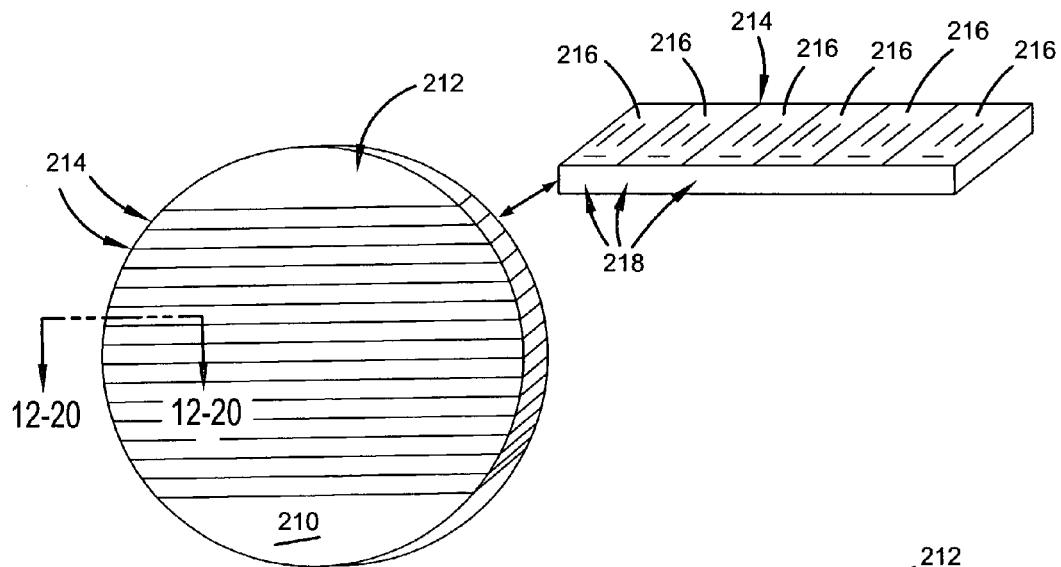
FIG. 11 schematically illustrates wafer fabrication of heads.

Heads 106 are typically formed by wafer fabrication processes as illustrated in FIG. 11. Transducer elements are typically formed on surface 210 of a wafer 212. The wafer 212 is then sliced into a plurality of slider bars 214 and a plurality of air bearing surfaces 216 are formed along the slider bar 214. Sliders 218 are sliced from the slider bar 214 to form heads for read-write operation. FIGS. 12-20 progressively illustrate a wafer fabrication embodiment for the transducer body and flexible interface or body in combination with fabrication of transducer elements to provide a transducer level control structure which can be wafer fabricated without complex processing steps.

Figure 13:
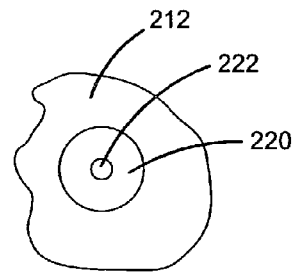
FIGS. 12-20 progressively illustrate an embodiment for wafer fabrication of a flexure body or interface between a slider body and a floating transducer body.
Figure 12:
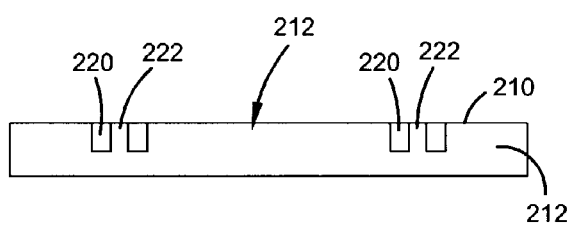
Figure 14:
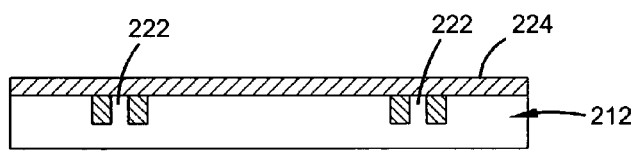
Figure 15:
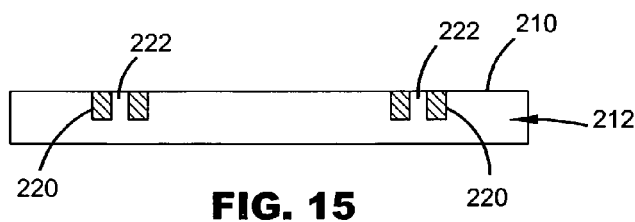

As shown in FIGS. 12-13, in the illustrated embodiment, flexure bodies are formed by etching a trench 220 having an unetched portion 222 in the trench 220 on the wafer surface 210. The trench 220 is etched using a deep reactive ion-etching process. A photoresist or oxide mask is used to pattern the trench 220. The unetched portion 222 in the trench 220 forms the first portion 164 of the flexible body or interface. Preferably the wafer is formed of a silicon wafer. In the illustrated embodiment, the trench 220 is annular shaped and the unetched portion 222 is cylindrical to form a cylindrical shaped flexure body or interface. As illustrated in FIGS. 14-15, a sacrificial layer 224 is deposited in the trenches 220 and is planarized (for example using chemical mechanical polishing "CMP") as illustrated in FIG. 15 to remove any sacrificial material, such as LPCVD germanium, from the surface of the wafer leaving the sacrificial material only in trenches 220. In a preferred embodiment, the sacrificial layer 224 is deposited using a conformal deposition technique such as low pressure chemical vapor deposition ("LPCVD").

Figure 16:
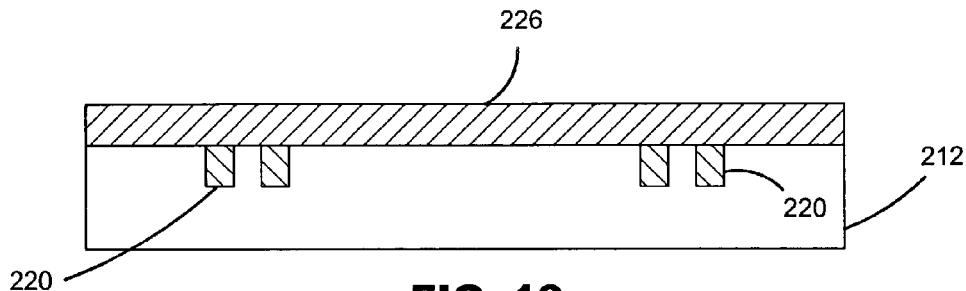
Figure 17:
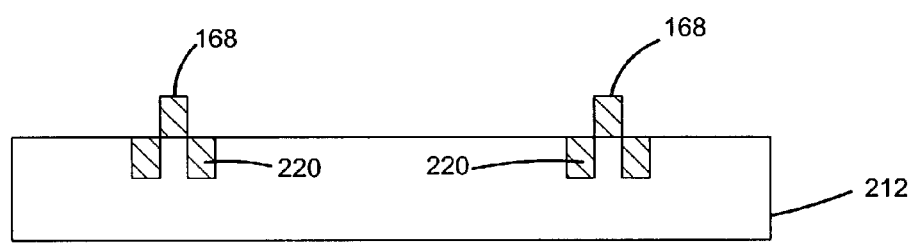
Figure 18:
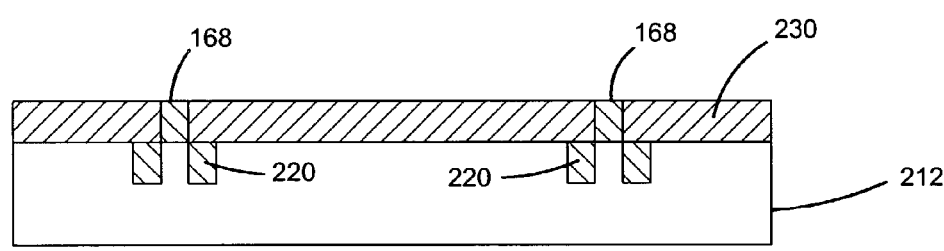
Figure 19:
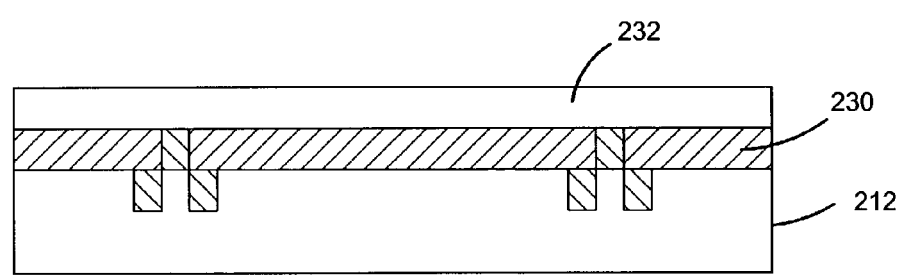
Figure 20:
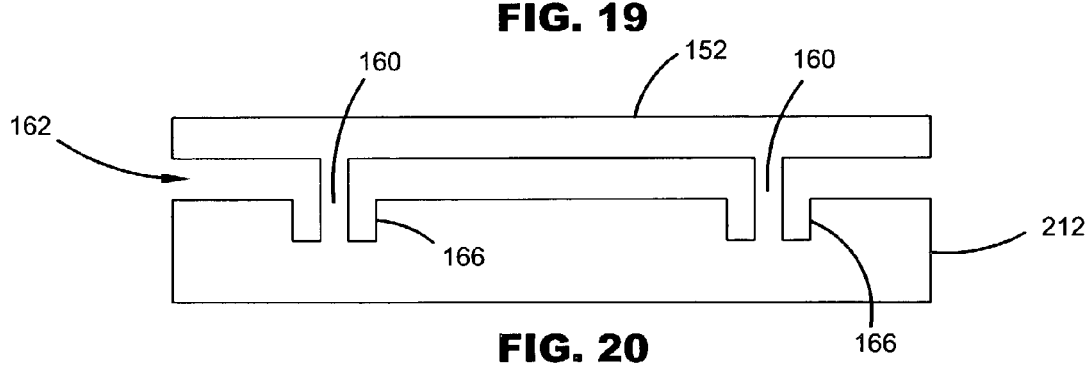

Thereafter, as illustrated in FIGS. 16, layer 226 is deposited and patterned or etched to form the second portion 168 of the flexure body as illustrated in FIG. 17. A sacrificial layer 230 is deposited over the surface and the surface is planarized as illustrated in FIG. 18. The transducer body and transducer layers or elements 232 are deposited on the sacrificial layer 230 using known transducer deposition or fabrication techniques. The sacrificial material 230 between the wafer 212 and the transducer body 232 and the sacrificial material in trenches 220 is etched to form flexure bodies 160 and the suspended or floating transducer body 152 as described which is fabricated using wafer fabrication techniques in combination with fabrication of the transducer portion of the head.

In one embodiment, sacrificial layers can be germanium, or germanium-rich SiGe. The transducer body 232 includes an alumina $Al_2O_3$ base coat or other electrically insulating material and transducer layers as used in standard read-write transducer fabrication processes. In one embodiment, layer 226 can be formed of an alumina material which is planarized using CMP. The wafer is diced into slider bars prior to etching the sacrificial layer 230 and air bearing surfaces are formed using known fabricating techniques. In one embodiment, gap is approximately a micron and the transducer body is 40 microns. Alternatively, the flexure body or portions can be formed by etching portions of the sacrificial layer prior to depositing the transducer body and application is not limited to the illustrated steps of FIGS. 12-20.

Figure 21:
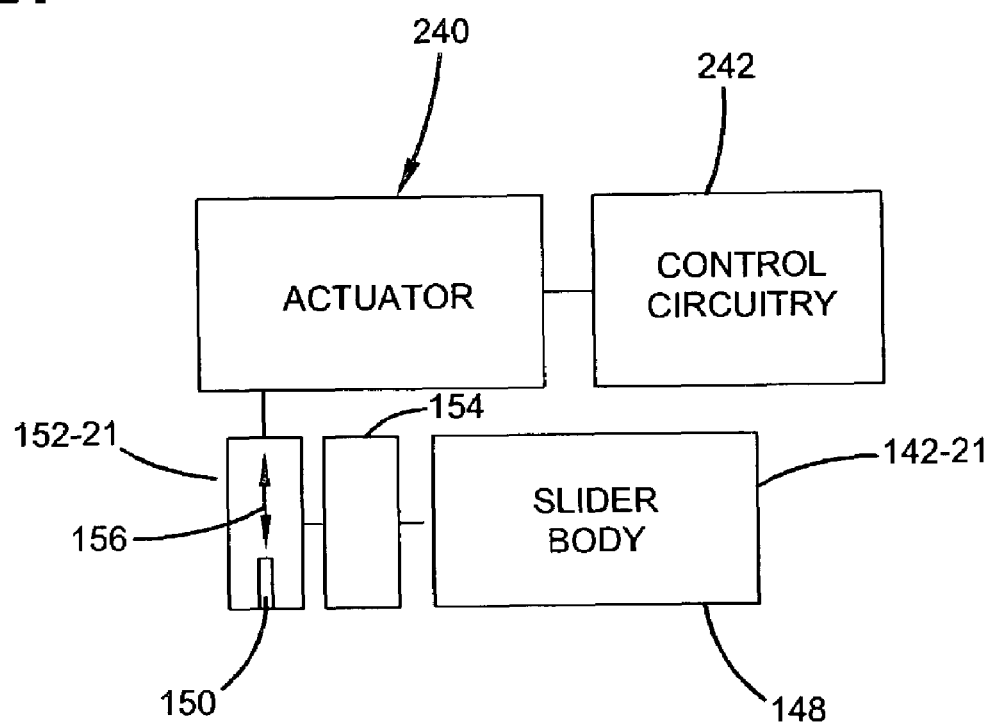
FIG. 21 is a schematic illustration of a head including a slider body and a transducer body having an actuator.

FIG. 21 illustrates an embodiment of floating transducer body 152-21 having an actuator 240 coupled to the transducer body 152-21 to supply a preload force to the transducer body or actuate the transducer body relative to the slider body. As shown, the actuator 240 is coupled to control circuitry 242 to supply a preload force to the transducer body 152. Thus, the preload force can be adjusted to compensate for manufacturing variations of the air bearing surface and suspension, disc velocity changes from the inner diameter ID to the outer diameter OD, altitude changes and other low frequency effects. In the illustrated embodiment, the flexure body can be designed to have a low spring stiffness to isolate the transducer body to provide transducer level dynamic control. In such applications, it may be desirable to use rectangular beams to increase off track stiffness.

Figure 22:
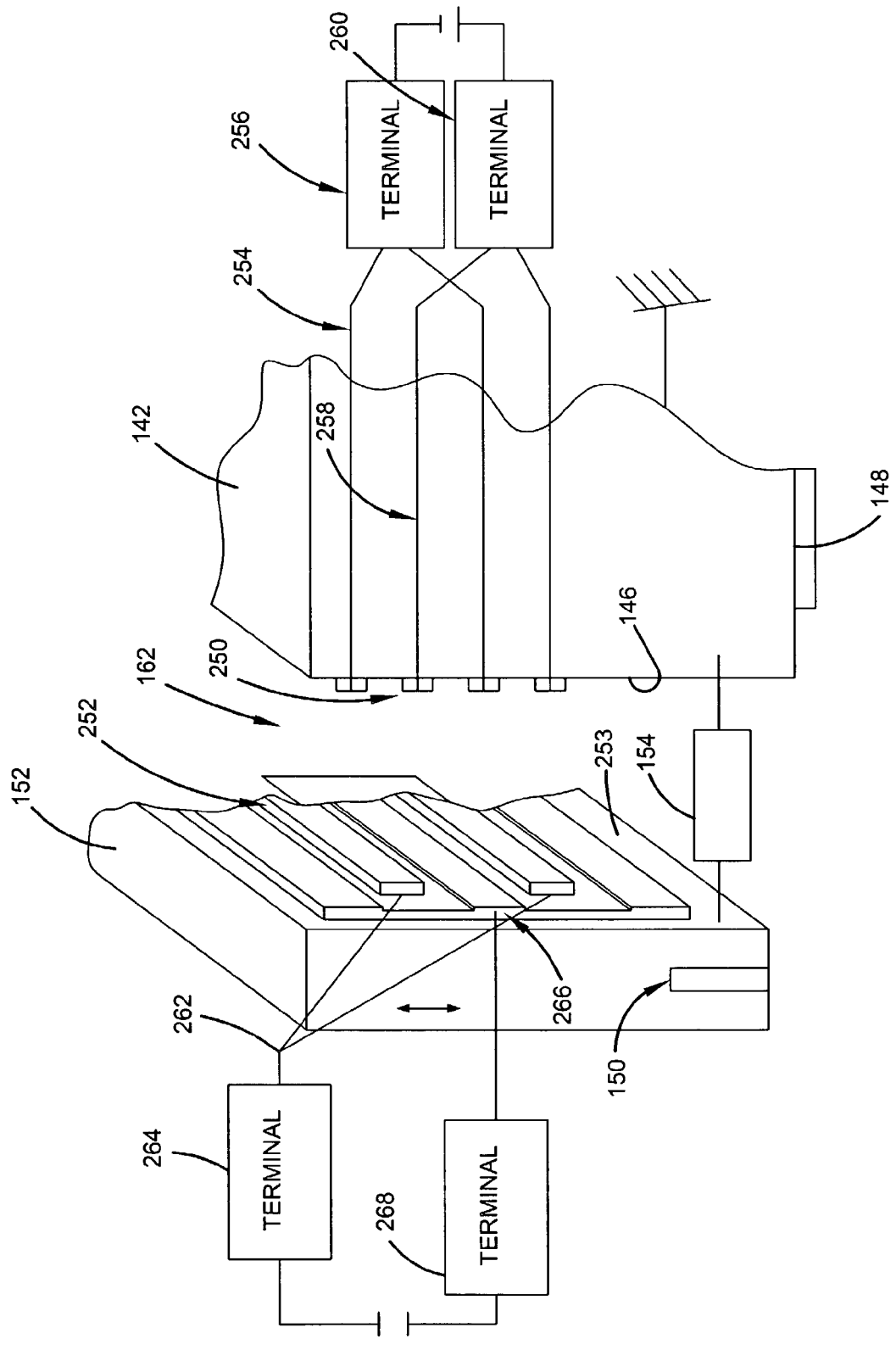
FIGS. 22-24 are schematic illustrations of an electrostatic actuator including an electrode assembly on the slider body and an electrode assembly on the transducer body.
Figure 23:
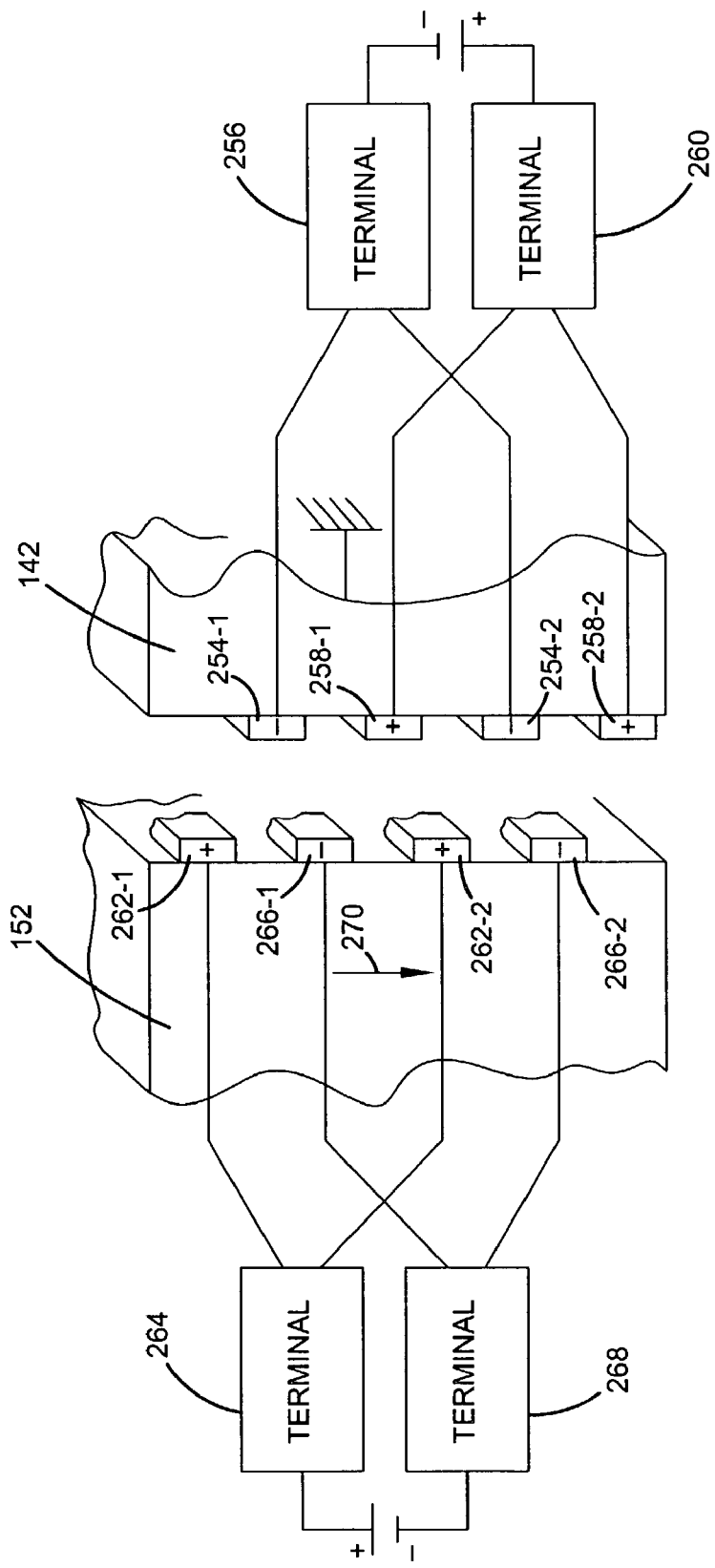
Figure 24:
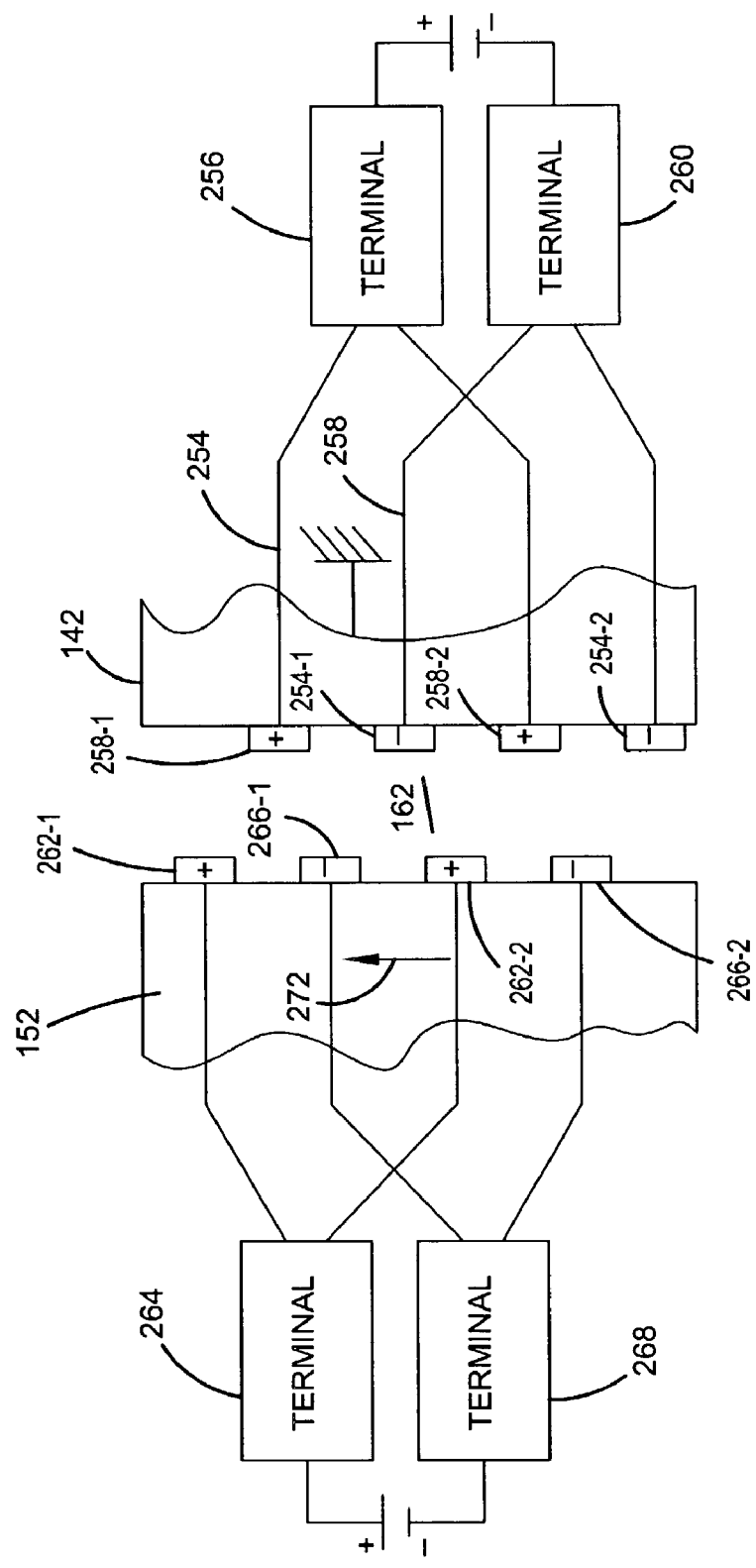
Figure 25:
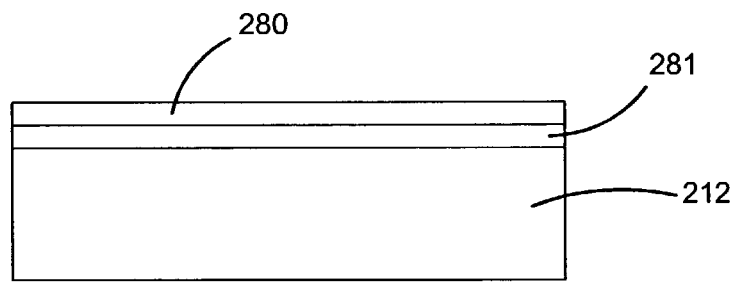
FIGS. 25-31 progressively illustrate a fabrication embodiment for an electrostatic actuator including electrodes on a slider body and electrodes on a transducer body.
Figure 26:
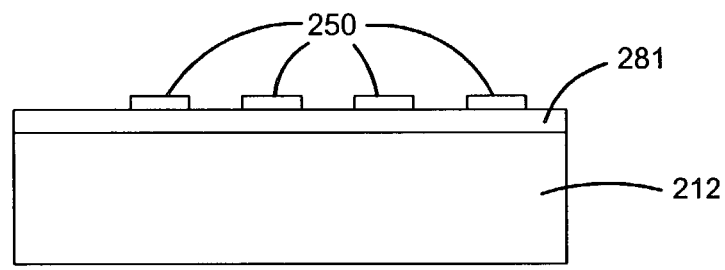

FIGS. 22-24 illustrate an embodiment of an electrostatic actuator disposed in the gap 162 to supply preload force to the transducer body. In the illustrated embodiment, the electrostatic actuator includes static electrode assembly 250 on the trailing edge of the slider body 142 and movable or dynamic electrode assembly 252 on a leading edge 253 of the transducer body 152 which are energized to provide desired preload force. In the embodiment shown, the static electrode assembly 250 include a first electrode comb 254 coupled to terminal 256 and a second electrode comb 258 coupled to terminal 260 and the movable electrodes 252 include a first electrode comb 262 coupled to terminal 264 and a second electrode comb 266 coupled to terminal 268. A voltage potential is supplied to terminals 256, 260 of the static electrode combs and terminals 264, 268 of the movable electrode combs to energize the electrodes to increase or decrease preload force for the transducer body 152 depending upon the polarity of the voltage potential.

In the illustrated embodiment, electrode combs 254, 258 and 262, 266 are formed in gap 162 and have a plurality of spaced patterned electrode fingers. As shown in FIG. 23, the fingers 254-1, 254-2, etc, 258-1, 258-2 of electrode combs 254, 258 are interspersed as shown and fingers 262-1, 262-2, 266-1, 266-2 of electrode combs 262, 266 are interspersed and the electrode fingers on the slider body are offset from the electrode fingers on the transducer body to provide relative movement of the transducer body relative to the slider body.

In particular, the electrode fingers of the electrode combs on the slider body and the transducer body include an elongated length extending along the trailing edge of the slider body and leading edge 253 of the transducer body. In the embodiment illustrated in FIG. 23, electrode fingers are energized to provide negative static electrode fingers 254-1, 254-2 offset in direction 270 from positive dynamic electrode fingers 262-1, 262-2 and positive static electrode fingers 258-1, 258-2 offset in the 270 direction from the negative dynamic electrode fingers 266-1, 266-2 and in an opposed direction, the off-set electrodes have similar polarity to provide actuation in the 270 direction.

In the embodiment of FIG. 24, electrode fingers are energized to provide positive static electrode fingers 258-1, 258-2 offset in the 272 direction from negative dynamic electrode fingers 266-1, 266-2 and negative static electrode fingers 254-1, 254-2 offset in the 272 direction from the positive electrode finger 262-2 and in an opposed direction, the offset electrodes have similar polarity to provide actuation in the 272 direction as shown. In one embodiment, the dynamic electrode combs 262, 266 are kept at the same potential while using the polarity and magnitude of the static electrode combs 254, 258 to control direction and magnitude of displacement. In an alternate embodiment, the static electrode combs 254, 258 are kept at the same potential while using the polarity and magnitude of the dynamic electrode combs 262, 266 to control the direction and magnitude of displacement.

In FIG. 23, the electrodes are energized to actuate the transducer body 152 in the direction illustrated by arrow 270 to increase load force or reduce fly height and in FIG. 24, electrodes are energized to actuate the transducer body 152 in the direction illustrated by arrow 272 to decrease load force or reduce fly height. Thus, electrode fingers 262-1, 262-2, 264-1, 264-2 on the transducer body are offset from the electrode fingers 254-1, 254-2, 258-1, 258-2 on the slider body so that the electrode fingers on the slider body and transducer body are alternately positioned to supply force to the transducer body as illustrated by arrows 270, 272 depending upon the polarity of the voltage potential.

Figure 27:
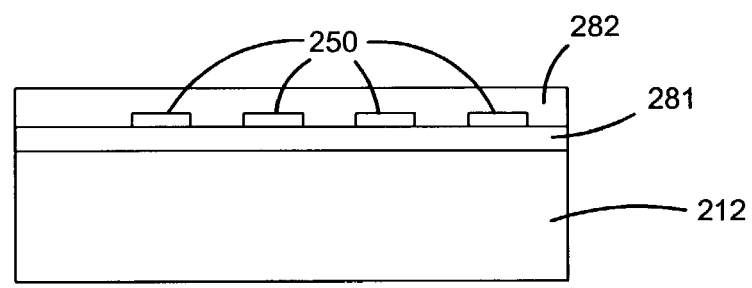
Figure 28:
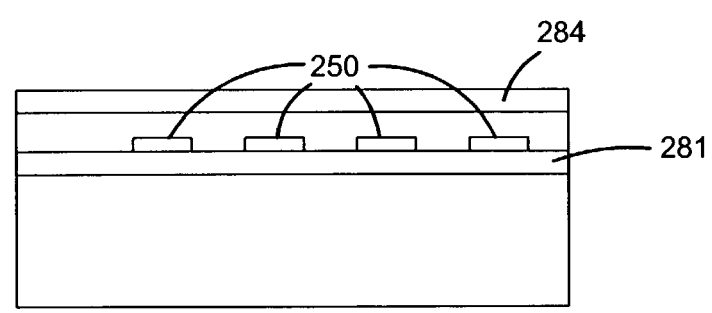
Figure 29:
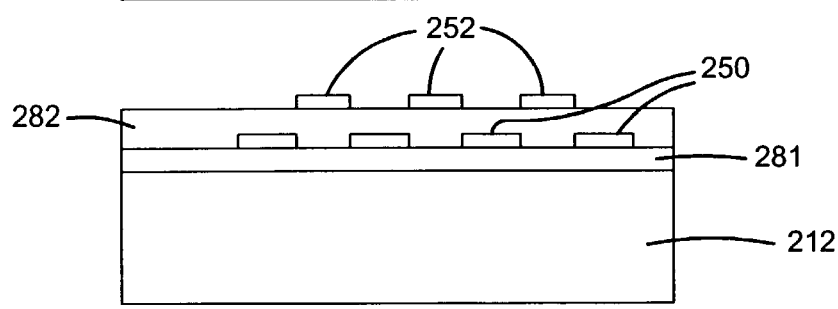

The electrostatic electrodes on the slider body and the transducer body can be fabricated at the wafer level for wafer fabrication. FIGS. 25-31 progressively illustrate a wafer fabrication embodiment for electrodes for actuation of the transducer body. As progressively shown in FIGS. 25-26, static electrodes or assembly 250 are etched from a conductive electrode layer 280 deposited on an insulating layer 281 on wafer 212. The insulating layer 281 provides electrical isolation for the static electrodes from the wafer 212 or substrate and from each other. The electrode layer 280 can be a sputtered tantalum. In one embodiment, the insulating layer 281 can include "LPCVD" silicon nitride layer, such as $Si_3N_4$. Sacrificial gap layer 282, such as sputtered germanium is deposited and planarized as shown in FIG. 27. The dynamic electrodes or assembly 252 are etched from a second conductive electrode layer 284, such as tantalum as progressively illustrated in FIGS. 28-29. An e-beam cured photoresist mask could be used to ion mill the electrode material to pattern the electrode assemblies and a plasma ash photomask used after milling.

Figure 30:
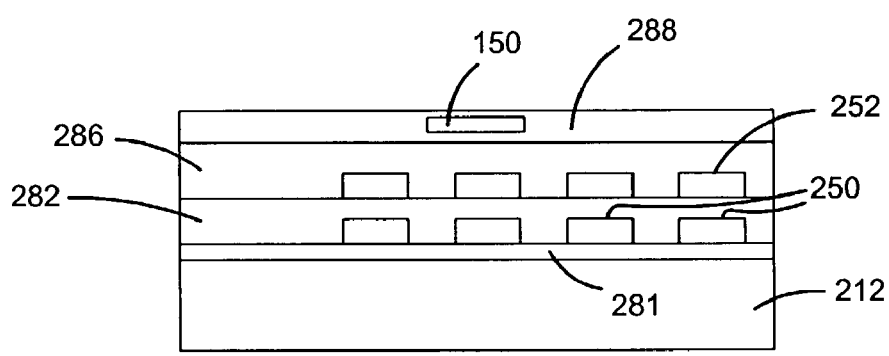
Figure 31:
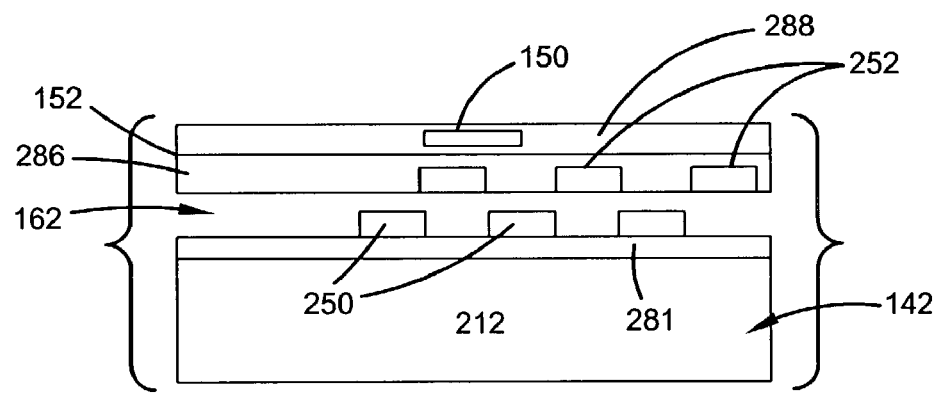

A transducer body layer 286 (such as Alumina) is deposited over the etched electrode 252 and planarized as illustrated in FIG. 30 as previously described. Transducer layers 288 including transducer elements 150 are deposited on the body layer 286 in accordance with known transducer fabrication techniques and slider bars are sliced and the sacrificial gap layer 282 is etched to form the electrodes or assemblies 250, 252 and gap 162 therebetween as illustrated in FIG. 31. Thus, as described, transducer elements 150 and electrodes or assembly 252 are supported on the floating transducer body 152 and electrodes or assembly 250 is formed on the slider body to provide an electrostatic actuator as described.

Figure 32:
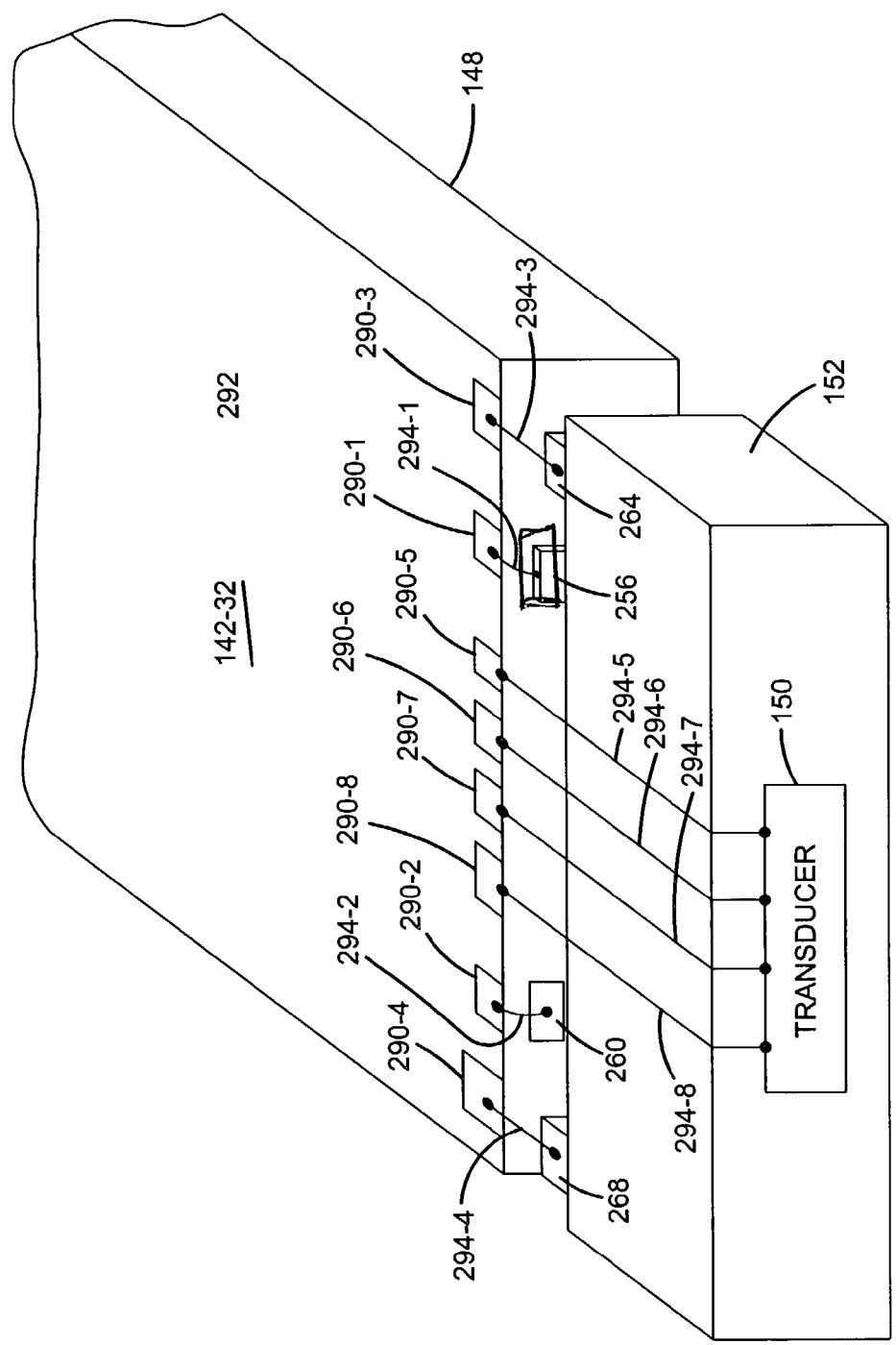
FIG. 32 schematically illustrates an embodiment of an electrical interface between the electrodes on the slider body and the electrodes and transducer elements on the transducer body.

The electrodes or assemblies 250, 252 and transducer elements 150 are electrically connected to drive circuitry for operation. The electrical interface for the transducer elements 150 and electrodes 252 must extend across gap 162. FIG. 32 illustrates an embodiment of an electrical interface for the transducer elements 150 and electrodes or assemblies 250, 252 including "flying leads" to provide an electrical connection for the transducer elements 150 and electrodes 252 on the transducer body 152 to limit resistance or interference with operating dynamics of the head or transducer body.

As shown, the slider body 142-32 includes terminal pads 290 on surface 292 opposed to the air bearing surface 148 of the slider body which electrically interface with drive circuitry. In the diagrammatically illustrated embodiment, terminal pads 290-1, 290-2 are conductively coupled to electrode terminals 256, 260 on the slider body 142-32 via leads 294-1, 294-2 illustrated diagrammatically. Terminal pads 290-3, 290-4 are conductively coupled to electrodes terminals 264, 268 for electrodes or assembly 252 on the transducer body 152 through leads 294-3, 294-4 which extend across gap 162. Terminal pads 290-5, 290-6, 290-7, 290-8 are coupled to transducer elements 150 via leads 294-5, 294-6, 294-7, 294-8 which extend across gap 162.

Figure 33:
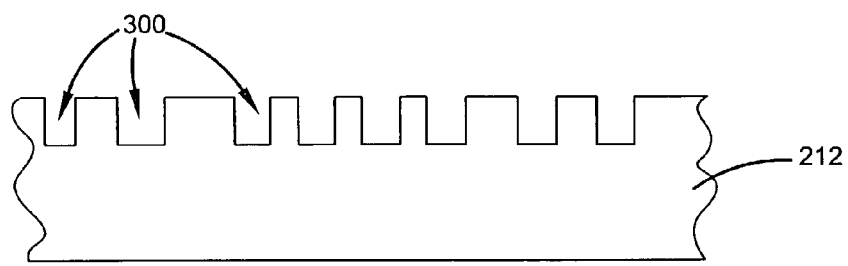
Figure 34:
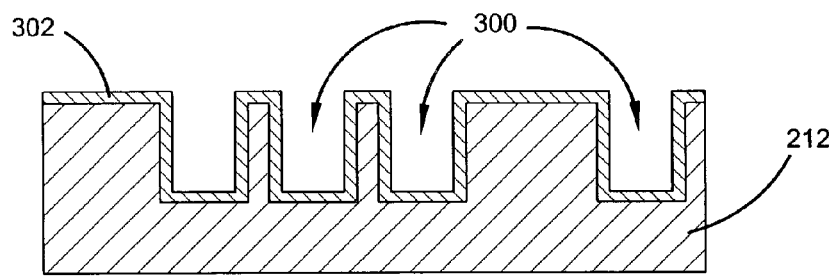
Figure 35:
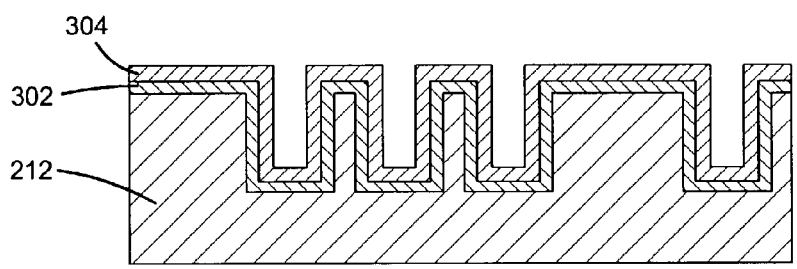

FIGS. 33-58 progressively illustrate a wafer fabrication embodiment for terminal pads 290 and leads 294. As shown in FIG. 33, terminal pad trenches 300 are etched from the wafer 212 by known deep reactive ion etching techniques. A resist or oxide mask can be used. An insulating layer 302 is deposited to insulate trenches 300 and a conductive seed layer 304 is deposited for electroplating as shown in FIGS. 34-35. In one embodiment, the insulating layer can be a silicon nitride such as LPCVD $Si_3N_4$ In one embodiment, the seed layer 304 can be tantalum or gold.

Figure 36:
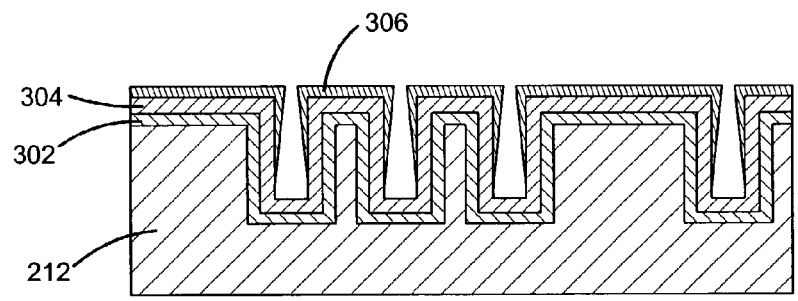
Figure 37:
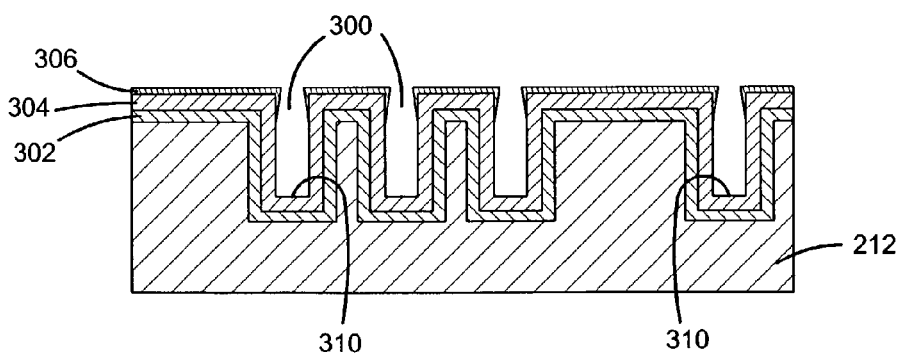

As shown in FIGS. 36-37, a non-conformal insulation layer 306 is deposited to cover an exposed surface of the seed layer 304 and layer 306 is isotropically etched as shown in FIG. 37 so that the conductive surfaces 310 in the trenches 300 are exposed. A timed wet or dry etch can be used. In one embodiment, the non-conformal insulation layer can be a plasma enhanced chemical vapor deposition "PECVD" silicon dioxide.

Figure 38:
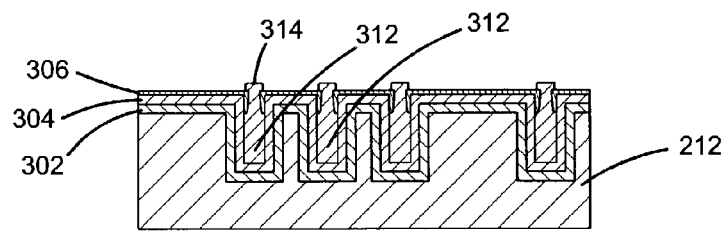
Figure 39:
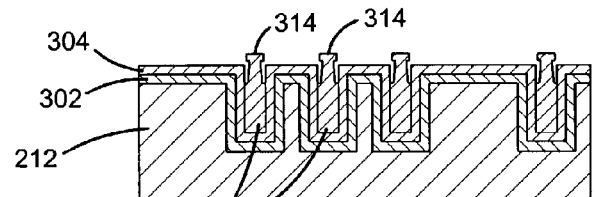
Figure 40:
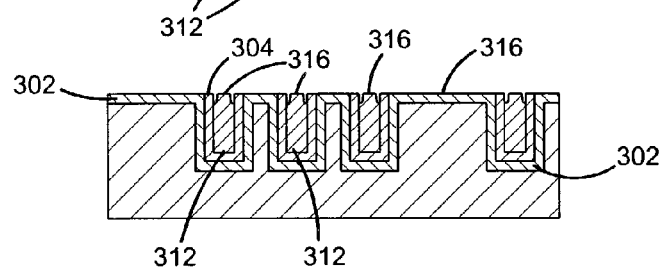

The conductive terminal pads 312 are formed in the trenches 300 by a conductive material, such as gold, by an electroplating process which includes a mushroom portion 314 as shown in FIG. 38. Thereafter, the insulating layer 304 is etched using a wet or dry isotropic etch as illustrated in FIG. 39, and the surface is planarized to layer 302 as illustrated in FIG. 40 to form portions 316. The surface may be planarized using lapping or CMP. Alternative methods of filling terminal pad trenches 300 with the metal, such as electroplating directly onto seed layer 306 without adding insulating layer 304 and using MOCVD metal deposition rather than electroplating are possible.

Figure 41:
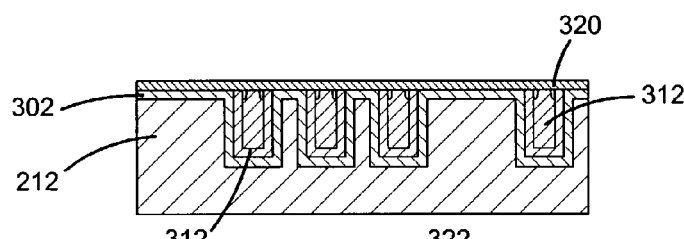
Figure 42:
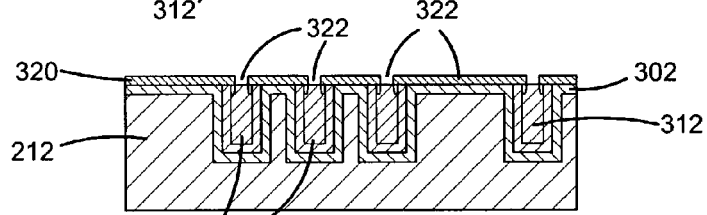
Figure 43:
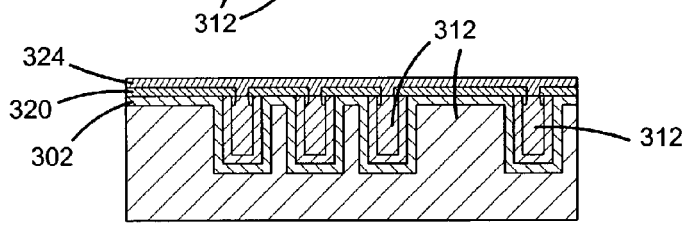
Figure 44:
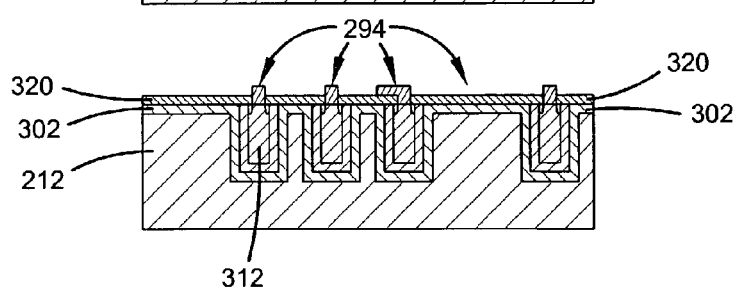

As shown in FIGS. 41-43, an insulating layer 320 is deposited as illustrated in FIG. 41 to cover the conductive terminal pad. In one embodiment, a PECVD silicon nitride can be used, such as $Si_3N_4$. Lead openings 322 are etched through the insulating layer 320 to terminal pads 312 as illustrated in FIG. 42 using standard photolithography and dry-etching. An electrode layer 324, as described previously, is deposited and fills openings 322 to the conductive terminal pads 312 as shown in FIG. 43. In one embodiment openings are "over-filled" and planarized to provide a flat surface for lithography. In the illustrated embodiment, the electrode layer 324 is etched to form the static electrode pattern (not shown), as previously described, and the leads 294 from the terminal pads 312 as shown in FIG. 44. An e-beam cured photoresist mask could be used to allow ion milling of the electrode material and a plasma ash photomask is used after milling.

Figure 45:
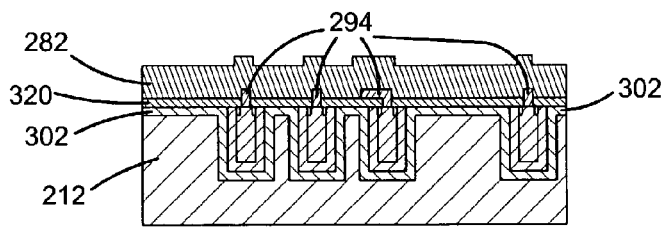
Figure 46:
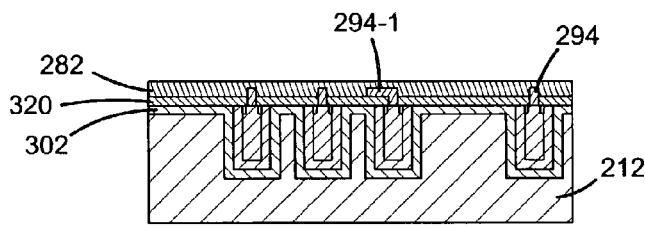
Figure 47:
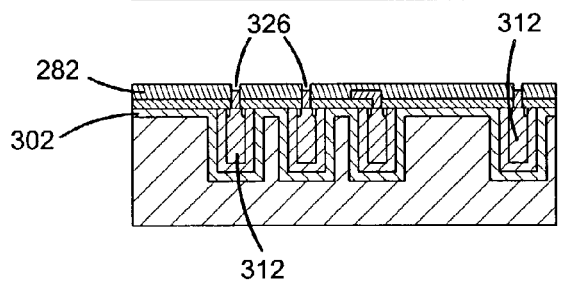
Figure 48:
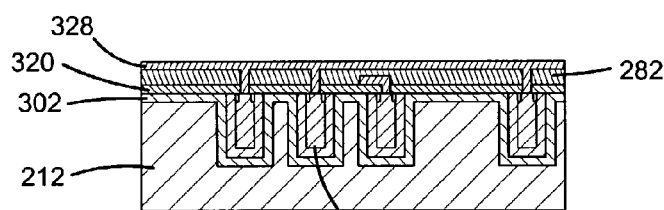
Figure 49:
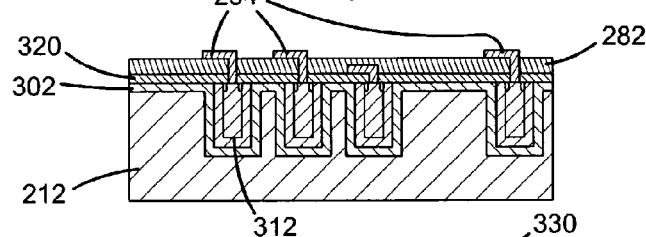

The sacrificial gap layer 282, as previously described, is deposited and planarized as illustrated in FIGS. 45-46. Prior to depositing the sacrificial layer an opening to trench 220 can be etched through the insulation layers to expose the top of the flexure body using standard photolithography and dry etching. Patterned lead openings or spaces 326 for leads 294 through the gap 162 to the transducer body 152 are etched in the sacrificial gap layer 282 as shown in FIG. 47 while leads 294-1, 294-2 electrically connect to the static electrodes etched from the electrode layer 324. An electrode layer 328 is deposited in lead spaces 326. For example, a sputtered tantalum layer of approximately 0.25 µm thick is deposited, as shown in FIG. 48. The layer 328 is patterned to form dynamic electrodes 252 (not shown) and leads 294-3, 294-4 in spaces 326 for the electrodes on the transducer body, as shown in FIG. 49.

Figure 50:
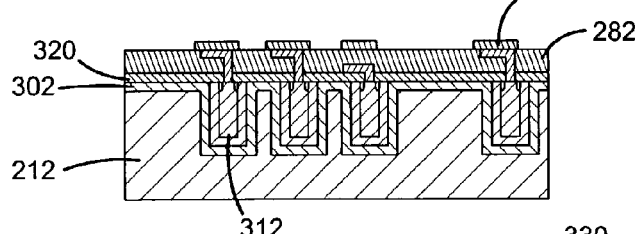
Figure 51:
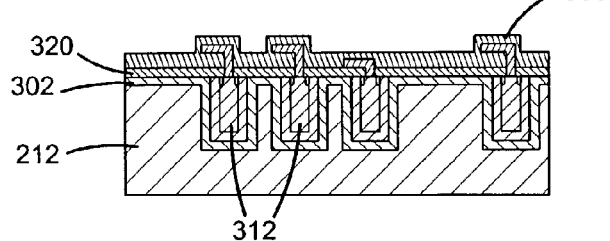
Figure 58:
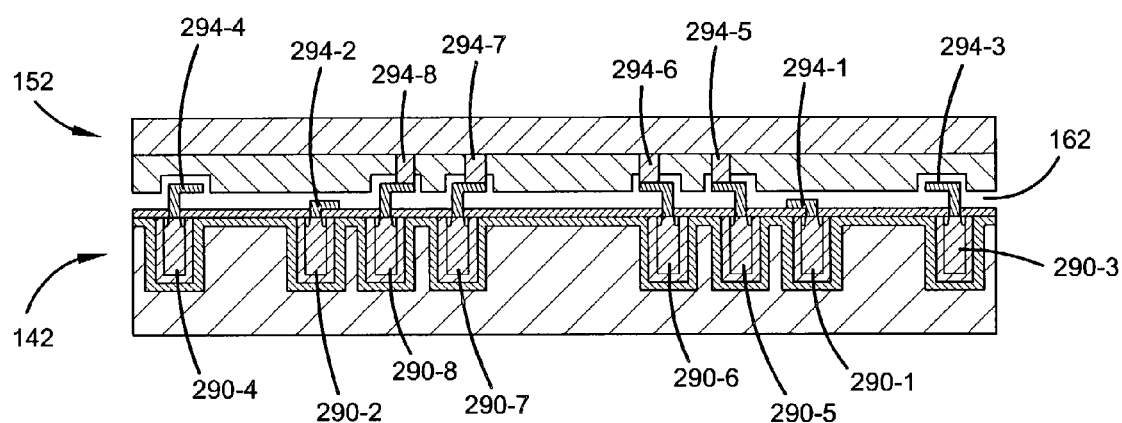

As shown in FIG. 50, a sacrificial layer 330, such as sputtered germanium is deposited and patterned etched to form the flying lead gap for transducer leads. The sacrificial layer 330 is patterned using standard photolithography and a timed dry etch. As shown in FIGS. 52-53, a body layer 332, such as alumina is deposited and planarized. In one embodiment, prior to depositing the body layer, an opening is etched through the sacrificial layer 330 using standard photolithography and dry etching to deposit or form the second portion of the flexure body and transducer body formed for example of an alumina material. The opening should be etched to slightly below the silicon or wafer surface to increase attachment area for the flexure body. As shown in FIG. 54, lead openings or spaces 334 for the transducer lead are etched through the body layer 332. The lead openings or spaces 334 are filled with a conductive portion 336 such as an electroplated gold, and planarized as illustrated in FIGS. 55-56.

Thereafter, the transducer layers 288 are deposited as illustrated in FIG. 57 and the wafer is sliced into bars (not shown) to form air bearing surfaces on the slider bar and/or transducer bodies along the slider bar. The sacrificial layer is etched as previously described and shown in FIG. 58 to form the floating transducer body and leads 194 extending to electrodes on the transducer body and transducer elements on the transducer body. A lapping step may be employed to lap the terminal pads of the slider bar. A germanium film layer for the sacrificial layer can be etched using a hydrogen peroxide.

A head for a data storage device including a floating transducer body (such as 152) flexibly coupled to a slider body (such as 142) and including at least one transducer element (such as 150). The transducer body (such as 152) is independent or floating to provide transducer level control for read-write operations.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular data storage device, it will be appreciated by those skilled in the art that the teachings of the present invention can be applied to other storage devices, without departing from the scope and spirit of the present invention.

What is claimed is:

1. A head comprising:
    a slider body having a leading edge, a trailing edge and an air bearing surface and the trailing edge including a trench formed in the slider body;
    a transducer body spaced from the trailing edge of the slider body to form a gap between the trailing edge of the slider body and the transducer body and the transducer body including at least one transducer element; and
    at least one flexure body in the gap between the slider body and the transducer body connecting the transducer body to the slider body, and the at least one flexure body including a flexure body portion extending in and movable within the trench of the slider body.

2. The head of claim 1 wherein the transducer body includes a raised bearing surface and a recessed bearing surface.

3. The head of claim 1 wherein the slider body includes a plurality of spaced trenches and including a plurality of spaced flexure bodies extending in the plurality of spaced trenches and in the gap between the slider body and the transducer body to connect the transducer body to the slider body.

4. The head of claim 1 wherein the at least one flexure body is cylindrical or rectangular shaped.

5. The head of claim 1 and further comprising an electrostatic actuator between the slider body and the transducer body to supply force to the transducer body in a direction towards or away from a surface of a data storage medium.

6. The head of claim 5 wherein the electrostatic actuator includes a static electrode assembly on the trailing edge of the slider body and a movable electrode assembly on a leading edge of the transducer body.

7. The head of claim 6 wherein the static electrode assembly on the slider body and the movable electrode assembly on the transducer body include a plurality of spaced electrode fingers coupled to a first terminal and a plurality of interspersed electrode fingers coupled to a second terminal.

8. A head comprising:
    a slider body having a leading edge, a trailing edge and an air bearing surface including at least one raised bearing surface and at least one recessed bearing surface;
    a transducer body spaced from the trailing edge of the slider body to form a gap between the trailing edge of the slider body and the transducer body and the transducer body including at least one transducer element; and
    at least two separate flexure bodies in the gap between the trailing edge of the slider body and the transducer body configured to floatably support the transducer body for movement in a direction towards or away from a surface of a data storage medium.

9. An apparatus comprising:
    a slider body including a leading edge, a trailing edge and a width dimension between opposed sides of the slider body and the slider body including a raised bearing surface and a recessed bearing surface; and
    a transducer body spaced from the trailing edge of the slider body and floatably supported relative to the slider body and the transducer body having a width dimension which is larger than a majority of the width dimension of the slider body.

10. The apparatus of claim 9 wherein the transducer body includes a raised bearing surface and a recessed bearing surface.

11. The apparatus of claim 9 and further comprising at least one flexure in a gap between the trailing edge of the slider body and the transducer body to floatably support the transducer body relative to the slider body.

12. The head of claim 9 and further comprising an actuator in a gap between the trailing edge of the slider body and the transducer body to move the transducer body relative to the slider body.

13. The head of claim 12 wherein the actuator moves the transducer body towards or away from a data storage surface.

14. The apparatus of claim 9 wherein the transducer body is generally the same width as the slider body.

15. The head of claim 1 and further comprising an actuator in the gap to move the transducer body relative to the slider body.

16. A head comprising:
    a slider body having a leading edge, a trailing edge and an air bearing surface;
    a transducer body spaced from the trailing edge of the slider body to form a gap between the trailing edge of the slider body and the transducer body and the transducer body including at least one transducer element; and
    at least one member connecting the slider body and the transducer body and the connecting member extending through an opening in a trailing edge surface of the slider body and the connecting member movable within said opening.

17. The head of claim 16 wherein the connecting member extends across the gap between the trailing edge of the slider body and the transducer body.

18. The head of claim 16 wherein the transducer body includes a raised bearing surface and a recessed bearing surface.

19. The head of claim 16 and further comprising an actuator in the gap and coupled to the transducer body to actuate the transducer body relative to the slider body.

20. The head of claim 16 wherein a portion of the connecting member extends from the opening in the trailing edge surface along a trench recessed from the trailing edge of the slider body and is movable within the trench.

21. The head of claim 19 wherein the actuator coupled to the transducer body provides a preload force to the transducer body.

22. The head of claim 19 wherein the actuator moves the transducer body in a direction towards or away from a data storage surface.

* * * * *